July 3, 1934.   F. LJUNGSTRÖM   1,965,293
BEARING
Filed July 6, 1932   2 Sheets-Sheet 2
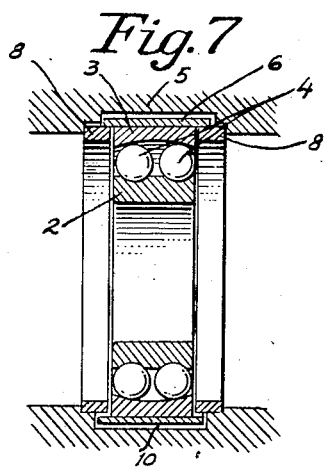
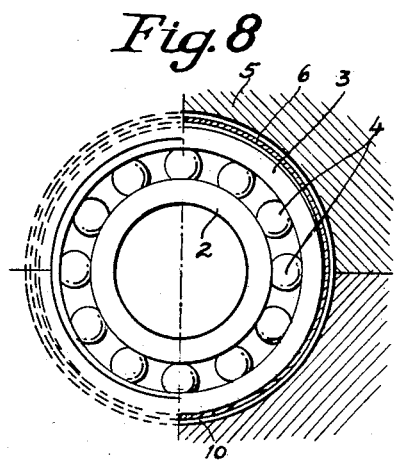
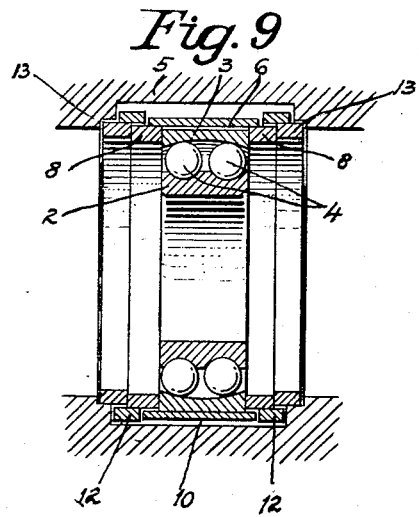
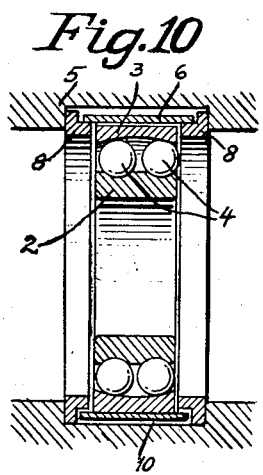
INVENTOR
Fredrik Ljungström
BY
Wm. T. Redlund
ATTORNEY Patented July 3, 1934

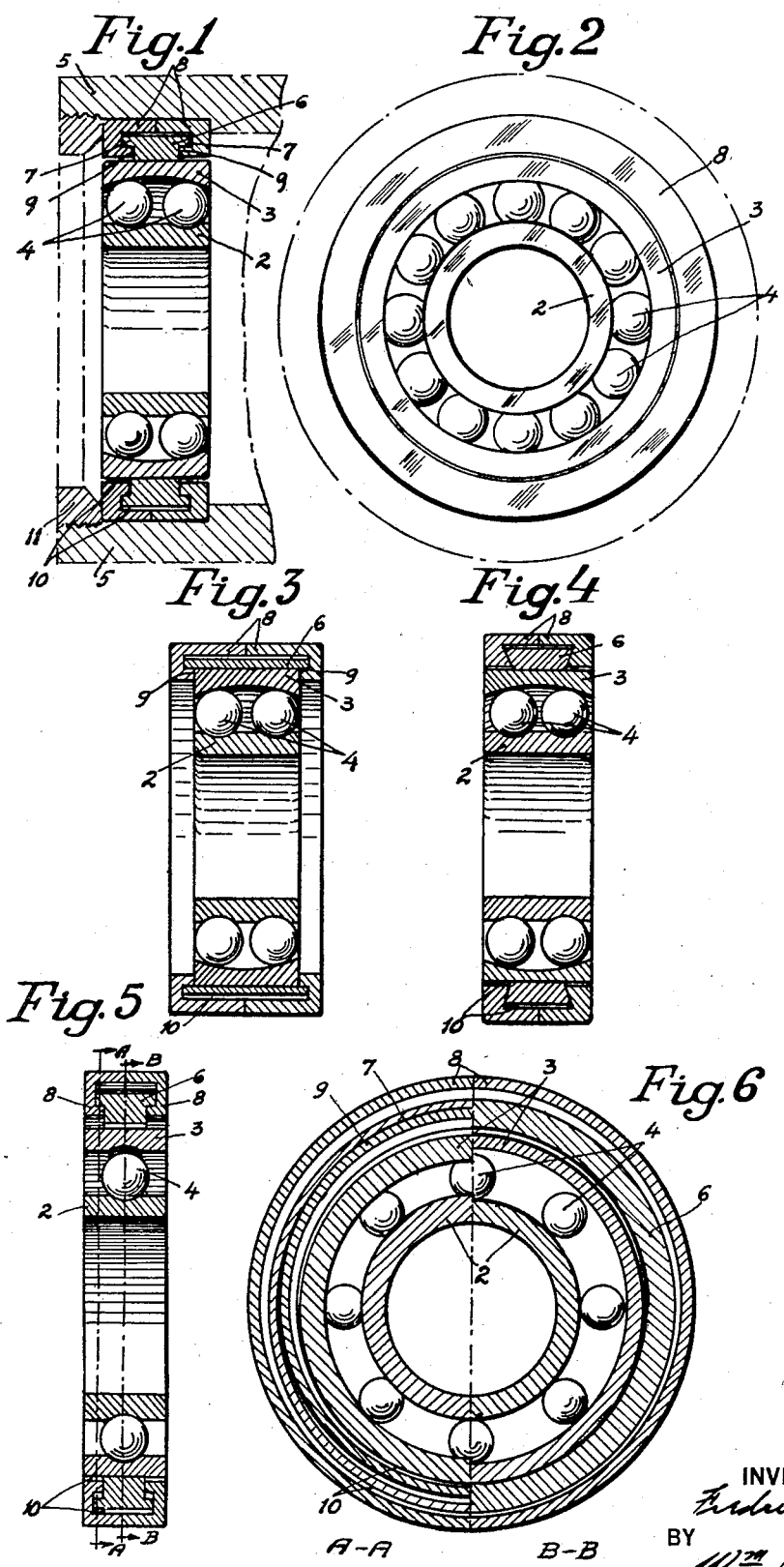

1,965,293

UNITED STATES PATENT OFFICE 1,965,293

BEARING

Fredrik Ljungström, Brevik, Lidingo, Sweden, assignor to Aktiebolaget Spontan, Stockholm, Sweden, a corporation of Sweden Application July 6, 1932, Serial No. 621,023
In Sweden April 22, 1931

14 Claims. (Cl. 308—184)

My invention relates to the anti-friction bearing art and particularly to radial bearings.

Among the objects of my invention is to provide a bearing capable of carrying greater loads and of being operated at higher speeds, while having a longer life and quieter operation, than is the case with previously known bearings.

All these objects, as will be clear from the following, are achieved by means for mounting the bearing preferably comprising one or more flexible or deformable ring elements embracing the outer bearing ring and forming a suspension mounting for the bearing.

In bearings of the type above set forth, and especially in bearings submitted to radial loads, the elements taking up the load of the bearing, for instance the balls, rollers or the like, are often unequally loaded, which is wholly undesirable. A thorough examination of the conditions, especially in ball bearings of usual design, shows that the ball through which the resultant of the load passes is subjected to the highest load and that the balls on each side of said resultant are subjected to loads, the magnitude of which depends on the distances of the balls from said resultant. When the balls reach the horizontal plane passing through the axis of rotation, and perpendicular to the load resultant, they no longer share in supporting the load.

In ball bearings constructed with extreme accuracy without any clearances and mounted without clearance, for instance in a bearing housing, it is usually calculated that the balls may be subjected to a maximum load which is equal to five times the load distributed on all balls in the bearing, that is to say, on the average, one fifth of the balls participate in supporting the load at any instant. If the bearing is mounted with clearances in a bearing housing or the like, or if clearances between the ball and the ball races are present, the load will be chiefly concentrated on the portion of the ball race or races adjacent the load resultant. The greater the clearance, the higher will be the load on that ball which is subjected to the maximum load, that is, the smaller will be the capacity of the bearing to take up bearing loads. For this reason good results from ball bearings of usual design depend to a considerable degree on the character of the mounting; if the ball bearing is mounted with clearance, its bearing capacity is decreased and this will be also the case, if the ball bearing itself is formed with clearances.

It is, however, desirable especially at high speeds to provide certain clearances between the ball races and the balls, as otherwise excess pressure would be set up within the bearing, even with small temperature differences between the ball races, which would result, on the one hand, in an overloading of the bearing and, on the other hand, in a constrained guidance of the balls within the bearing, that is, the balls are forced to roll in positions determined by their frictional engagement with the two ball races. This in turn would oppose the action between the balls and the ball retainer of the bearing, which latter serves in known manner to space the balls at a suitable distance from each other. In a bearing of this type constructed without clearances the angular velocity of the balls varies somewhat on account of small differences in the diameters of the balls or because the balls are unable to assume the relative positions which are a condition of their free rolling. Strong counter forces arise between the balls and the ball retainer which produce heat and cause wear and destruction of the bearing, especially at high speeds.

In bearings of the above type and especially in bearings adapted for high speeds it is therefore of the greatest importance that the balls rolling on the unloaded side or zone of the bearing are free, due to the provision of suitable clearances in the bearing so as to be able to take up new free positions in relation to the ball retainer, the work of the balls within the bearing, being decreased by a constrained guiding action during half a revolution and free movement during half a revolution. During the constrained movement a minute change in the relative positions of the balls occurs which is corrected during the subsequent half revolution during which the balls are moving freely. In this way interaction and friction between the balls and the ball retainer is eliminated in bearings provided with clearances.

The above remarks regarding ball bearings is also applicable as well to bearings having load transmitting members in the form of rollers, blocks, or the like.

As above indicated, the mounting of the bearing according to my present invention comprises one or more flexible or deformable ring elements embracing the outer ring of the bearing and forming a suspension mounting for the bearing. This will allow the bearings to be constructed with clearances so as to eliminate any risk of interaction and friction between the load transmitting members and a retainer for determining their positions and will thus allow a higher speed and a higher load than has hitherto been possible. At the same time the manufacture of that part in which the bearing is to be mounted, such as a bearing housing, will be facilitated without any requirements of accuracy as to fit of the bearings.

The mounting according to the invention may, for instance, comprise an element which embraces the outer ring of the bearing and which when loaded is free by resilient deformation to assume such a form as to contact as a sling the loaded half of the bearing so that the load is distributed among half the number of the load transmitting members, such as balls. By means of one or more additional annular elements said ring element may be suspended in the bearing housing, preferably with clearance. By this means the ring element suspending the bearing will transmit a radial load acting on one side of the bearing to the diametrically opposite side thereof where the load will be taken up by the annular element or elements forming a suspension support for the ring element. It will thus be seen that the ring element embracing the outer ring of the bearing will be subjected to tensional stresses while the annular element resting on the bearing housing and supporting said ring element is subjected to compressive stresses, which renders the mounting of the bearing very resilient. The resilience thus obtained of the mounting may be advantageous not only in bearings of the kind above set forth, but generally in all types of bearings, for instance in sliding bearings, or whenever a high resiliency is wanted, as for instance in bearings used in connection with gears, in pivot bearings for separators, and so forth.

The invention will be hereinafter more fully described with reference to embodiments illustrated by way of example in the accompanying drawings in which:—

Figs. 1 and 2 are an axial section, and a side view, respectively, or a ball bearing of usual design mounted according to the invention in a stationary element such as a bearing housing;

Figs. 3 and 4 are sections of the same ball bearing with somewhat modified mounting means;

Figs. 5 and 6 are an axial section, and a side view, respectively, of an embodiment of a ball bearing with mounting means according to Fig. 1 showing on enlarged scale the clearances in the bearing when loaded; and Figs. 7–10 illustrate further modifications of the mounting means especially adapted for obtaining high resilience and silent operation of the bearing.

In the embodiments shown in the drawings corresponding parts are designated by the same reference character in order to facilitate the understanding of the invention. Referring, for instance, to Figs. 1 and 2, the ball bearing comprises an inner race ring 2, an outer deformable race ring 3 and two rows of balls 4 interposed between said rings. This ball bearing is mounted in a stationary element 5, for example a bearing housing, machine frame or the like, by a mounting device constructed in accordance with the invention. This device comprises a flexible ring 6 having an inner diameter corresponding to the outer diameter of the race ring 3 and formed with lateral annular projections or flanges 7. The flexible ring 6 is surrounded by an outer annulus 8 formed of two halves and provided with annular flanges or abutments 9 adapted to co-operate with the lateral flanges 7 of the ring 6. Between the outer surface of ring 6 and the inner surface of annulus 8 there is a clearance space 10 for a purpose hereinafter described.

On mounting the bearing in the bearing housing 5 the ring 6 is first fitted on the outer race ring 3 of the bearing and then the annular elements 8, 8 are fitted on ring 6 and secured within the bearing housing 5 in any suitable manner, for instance, by means of a threaded member 11 screwed into said bearing housing.

As is clear from the figures, the ball bearing thus rests in ring 6 which, by means of its lateral flanges 7, is suspended in the outer annulus 8. When the bearing is subjected to a radial load having its resultant directed, for example straight downwards, as seen in the figures, tensional forces will be set up in ring 6 causing the same to be deformed in such a manner as to engage the lower half, or loaded zone of the outer race ring 3 in the form of a sling or the like. This deformation of ring 6 is rendered possible by virtue of the clearance between ring 6 and the annulus 8. The tensional stresses in the carrier ring 6 are transmitted to the opposite side of the axis of rotation of the bearing to the elements 8, and particularly to the lateral flanges 9, and cause the latter to be subjected to compressive forces directed radially inwardly, which forces are in turn transmitted to the opposite side of the axis of rotation through the pressure rings 8 and evenly distributed to the bearing housing 5.

On account of ring 6 supporting the ball bearing, as in a sling, and conforming closely to the lower part of the outer race ring 3, due to its deformation under the action of the load, it is evident that the load is uniformly distributed to all balls in the lower half of the bearing.

Fig. 3 illustrates a device according to the invention in a somewhat modified form. In this case ring 6 supporting the bearing, as apparent from the figure, is formed with an inner diameter corresponding to the outer diameter of the outer ring 3 of the bearing, as is the case in Figs. 1 and 2, but is somewhat wider than the bearing, the portions of the supporting ring 6 projecting axially beyond the bearing ring 3 corresponding to the lateral flanges 7 in Figs. 1 and 2. These projecting portions 7 are suspended on the flanges 9 of the annular elements 8, 8. The operation of the device is the same as that shown in Figs. 1 and 2.

In the embodiment shown in Fig. 4 the supporting ring 6 has a dovetail cross-section engaging correspondingly shaped recesses in the annular elements 8, 8.

Figs. 5 and 6 illustrate a bearing with a mounting according to the invention, all clearances in these figures being shown on enlarged scale.

In Figs. 7 and 8 a modified embodiment of the invention is shown in which the bearing is supported in the ring element 6, which element is suspended on two annular elements, corresponding to annulus 8 in Figs. 1 through 6, which transmit the load to the bearing housing. When the bearing is subjected to a radial load having its resultant directed downwards, tensional forces are set up in ring 6 and compressive forces in rings 8. Due to this a very resilient and yielding suspension of the bearing is achieved which results in very silent operation of the bearing.

This way of suspending the bearing may, as will be seen from Fig. 9, be modified in such a manner that compression rings 8 are supported in tension ring elements 12, which in turn rest on annular compression ring elements 13, the latter transmitting the load to the bearing housing. The radial load acting on the bearing is thus transmitted to the bearing housing by a plurality of ring elements alternatively subjected to tensional and compressive stresses. Of course further sets of ring elements may be interconnected between the bearing and the bearing housing for obtaining very silent operation and an extraordinarily high resilience of the bearing.

In Fig. 10 a very simple and suitable embodiment of the invention is shown whereby the annular elements 8 have an angular cross-section which renders the construction and mounting of the suspending means very simple.

In all embodiments shown in Figs. 7–10 the clearance space 10 for rendering possible the deformation of ring 6 is between said ring 6 and the bearing housing.

It is apparent that the mounting device according to the invention is very simple and suited for large scale manufacture, and permits delivery of a bearing together with such a device, with but inconsequential increase in cost. A great many tests of the invention have shown that the mounting device according thereto on an average increases the load capacity of an ordinary bearing about 60% and increase the life of the bearing by at least three times, while at the same time reducing the noise of the bearing elements to one third of the usual.

What I claim is:—

1. A bearing for sustaining load in any radial direction comprising an inner circular race ring, an outer normally circular distortable race ring, a plurality of bearing elements between said rings, said rings providing a wider space between them than such as to give contact of the bearing elements with both rings around the entire bearing, and means to distort said outer ring into substantially complete contact with the bearing elements in any zone which is under load while spreading the rings in the unloaded zone.

2. A bearing for sustaining load in any radial direction comprising an inner circular race ring, an outer normally circular distortable race ring, a plurality of bearing elements between said rings, said rings providing a wider space between them than such as to give contact of the bearing elements with both rings around the entire bearing, and means to suspend said outer ring so as to distort said outer ring into substantially complete contact with the bearing elements in the loaded zone while spreading the rings in the unloaded zone.

3. In a radial bearing for sustaining load in any radial direction, an inner rotatable ring, an outer stationary resilient ring, bearing members between said rings, a flexible ring embracing the outer periphery of said outer ring, and means for suspending said flexible ring so that said flexible ring is under tension when the bearing is loaded in any radial direction.

4. In a radial bearing for sustaining load in any radial direction, an inner rotatable ring, an outer stationary resilient ring, bearing members between said rings, a flexible ring embracing the outer periphery of said outer ring, and annular means for suspending said flexible ring so that said flexible ring is under tension when the bearing is loaded in any radial direction.

5. In a radial bearing for sustaining load in any radial direction, an inner rotatable ring, an outer stationary resilient ring, bearing members between said rings, a flexible ring embracing the outer periphery of said outer ring, and means engaging radially inward surface portions of said flexible ring for suspending said flexible ring so that the latter is under tension when the bearing is loaded in any radial direction.

6. In a radial bearing for sustaining load in any radial direction, an inner rotatable ring, an outer stationary resilient ring, bearing members between said rings, a flexible ring embracing the outer periphery of said outer ring, and annular means for engaging radially inward surface portions of said flexible ring for suspending said flexible ring so that the latter is under tension when the bearing is loaded in any radial direction.

7. In a radial bearing for sustaining load in any radial direction, an inner rotatable ring, an outer stationary resilient ring, bearing members between said rings, a flexible ring embracing the outer periphery of said outer ring, said flexible ring being formed with axially projecting annular portions, and an annular member engaging the inner surface of each projection for suspending said flexible ring so that the latter is under tension when the bearing is loaded in any radial direction.

8. In a radial bearing for sustaining load in any radial direction, an inner rotatable ring, an outer stationary resilient ring, bearing members between said rings, a flexible ring embracing the outer periphery of said outer ring, said flexible ring being formed with axially projecting annular portions, and a member having an axial projecting annular portion engaging the inner surface of each projection on said flexible ring for suspending the flexible ring so that the latter is under tension when the bearing is loaded in any radial direction.

9. In a radial bearing for sustaining load in any radial direction, an inner rotatable ring, an outer stationary resilient ring, bearing members between said rings, a flexible ring embracing the outer periphery of said outer ring, said flexible ring being wider in axial direction than said outer ring, and an annular member engaging the inner surface of the portion of each end of said flexible ring which projects beyond said outer ring for suspending the flexible ring so that the latter is under tension when the bearing is loaded in any radial direction.

10. In a radial bearing for sustaining load in any radial direction, an inner rotatable ring, an outer stationary resilient ring, bearing members between said rings, a flexible ring embracing the outer periphery of said outer ring, said flexible ring having a T-shaped cross-section with the branches of the T radially outward, and a member having an annular portion engaging the radially inner surface of each branch of the T for suspending said flexible ring so that the latter is under tension when the bearing is loaded in any radial direction.

11. In a radial bearing for sustaining load in any radial direction, an inner rotatable ring, an outer stationary resilient ring, bearing members between said rings, a flexible ring embracing the outer periphery of said outer ring, said flexible ring having a dovetail shaped cross-section with side edges converging toward the center of the bearing, and a member having an annular rim engaging each of said side edges for suspending said flexible ring so that the latter is under tension when the bearing is loaded in any radial direction.

12. In a radial bearing for sustaining load in any radial direction, an inner rotatable ring, an outer stationary resilient ring, bearing members between said rings, a flexible, resilient ring embracing the outer periphery of said outer ring, and means engaging radially inward surface portions of said flexible, resilient ring for suspending the flexible, resilient ring so that the latter is under tension when the bearing is loaded in any radial direction.

13. In a radial bearing for sustaining load in any radial direction, an inner rotatable ring, an outer stationary resilient ring, bearing members between said rings, a flexible, resilient ring embracing the outer periphery of said outer ring, and annular means for engaging radially inward surface portions of said flexible, resilient ring for suspending the flexible, resilient ring so that the latter is under tension when the bearing is loaded in any radial direction.

14. In a radial bearing for sustaining load in any radial direction, an inner rotatable ring, an outer stationary resilient ring, bearing members between said rings, a flexible, resilient ring embracing the outer periphery of said outer ring, compression rings for engaging radially inward surface portions of said flexible resilient ring for suspending the latter, tension rings engaging radially outward surface portions of said compression rings for supporting the latter, and additional compression rings engaging radially inward surface portions of said tension rings for suspending the latter.

FREDRIK LJUNGSTRÖM.